(12) United States Patent
Perera et al.

(10) Patent No.: US 11,522,193 B1
(45) Date of Patent: Dec. 6, 2022

(54) WATER SOLUBLE PAA-BASED POLYMER BLENDS AS BINDERS FOR SI DOMINANT ANODES

(71) Applicant: Enevate Corporation, Irvine, CA (US)

(72) Inventors: Sanjaya D. Perera, Irvine, CA (US); Benjamin Park, Irvine, CA (US); Younes Ansari, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/344,726

(22) Filed: Jun. 10, 2021

(51) Int. Cl.
| | |
|---|---|
| H01M 4/62 | (2006.01) |
| H01M 4/04 | (2006.01) |
| H01M 4/13 | (2010.01) |
| H01M 4/38 | (2006.01) |
| H01M 4/66 | (2006.01) |
| H01M 10/05 | (2010.01) |
| H01M 4/1395 | (2010.01) |
| H01M 10/0525 | (2010.01) |
| C09D 7/61 | (2018.01) |
| C09D 133/02 | (2006.01) |
| H01M 4/134 | (2010.01) |
| H01M 4/02 | (2006.01) |

(52) U.S. Cl.
CPC .............. *H01M 4/622* (2013.01); *C09D 7/61* (2018.01); *C09D 133/02* (2013.01); *H01M 4/0404* (2013.01); *H01M 4/134* (2013.01); *H01M 4/1395* (2013.01); *H01M 4/386* (2013.01); *H01M 4/624* (2013.01); *H01M 4/661* (2013.01); *H01M 4/669* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2012/0094178 A1* 4/2012 Loveridge ............. H01M 4/386
252/514
2012/0326500 A1* 12/2012 Hirose ................ H01M 4/5825
429/231.95

(Continued)

FOREIGN PATENT DOCUMENTS

WO 2016123272 A1 8/2016

OTHER PUBLICATIONS

H. Yin et. al. "Tailoring the Polymer-Derived Carbon Encapsulated Silicon Nanoparticles for High-Perfomnance Lithium-Ion Battery Anodes", CS Appl. Energy Mater. 2020, 3, 1, pp. 268-278.

(Continued)

*Primary Examiner* — Maria Laios
*Assistant Examiner* — Angela J Martin
(74) *Attorney, Agent, or Firm* — McAndrews, Held & Malloy, Ltd.

(57) ABSTRACT

Systems and methods utilizing water soluble (aqueous) PAA-based polymer binders for silicon-dominant anodes may include an electrode coating layer on a current collector, where the electrode coating layer is formed from silicon and a pyrolyzed water soluble PAA-based polymer blend, wherein the water soluble PAA-based polymer blend comprises PAA and one or more additional water-soluble polymer components. The electrode coating layer may include more than 70% silicon and the anode may be in a lithium ion battery.

17 Claims, 12 Drawing Sheets

(56) References Cited

U.S. PATENT DOCUMENTS

| | | | | |
|---|---|---|---|---|
| 2014/0170482 A1* | 6/2014 | Park | ........................ | H01M 4/13 |
| | | | | 429/211 |
| 2015/0340698 A1* | 11/2015 | Take | ................. | H01M 10/0525 |
| | | | | 429/212 |
| 2016/0149207 A1* | 5/2016 | Lahlouh | ................. | H01M 4/602 |
| | | | | 429/213 |
| 2017/0373338 A1* | 12/2017 | Teranishi | .............. | H01M 4/139 |
| 2018/0198114 A1* | 7/2018 | Bonhomme | ........ | H01M 4/0404 |
| 2021/0151741 A1* | 5/2021 | Zhamu | ................ | H01M 10/054 |
| 2021/0151772 A1* | 5/2021 | Li | ........................... | H01M 4/13 |
| 2021/0384487 A1* | 12/2021 | Ansari | ................ | H01M 4/0404 |

OTHER PUBLICATIONS

H. Kronberger et. al. "Silicon/Mesoporous Carbon (Si/MC) Derived from Phenolic Resin for High Energy Anode Materials for Li-ion Batteries: Role of HF Etching and Vinylene Carbonate (VC) Additive", Batteries 2019, 5(1), p. 11.

* cited by examiner

WATER SOLUBLE PAA-BASED POLYMER BLENDS AS BINDERS FOR SI DOMINANT ANODES

FIELD

Aspects of the present disclosure relate to energy generation and storage. More specifically, certain embodiments of the disclosure relate to a method and system for water soluble (aqueous) PAA-based polymer binders for silicon-dominant anodes.

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using water soluble PAA-based polymer binders for silicon anodes in Li-ion battery electrodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
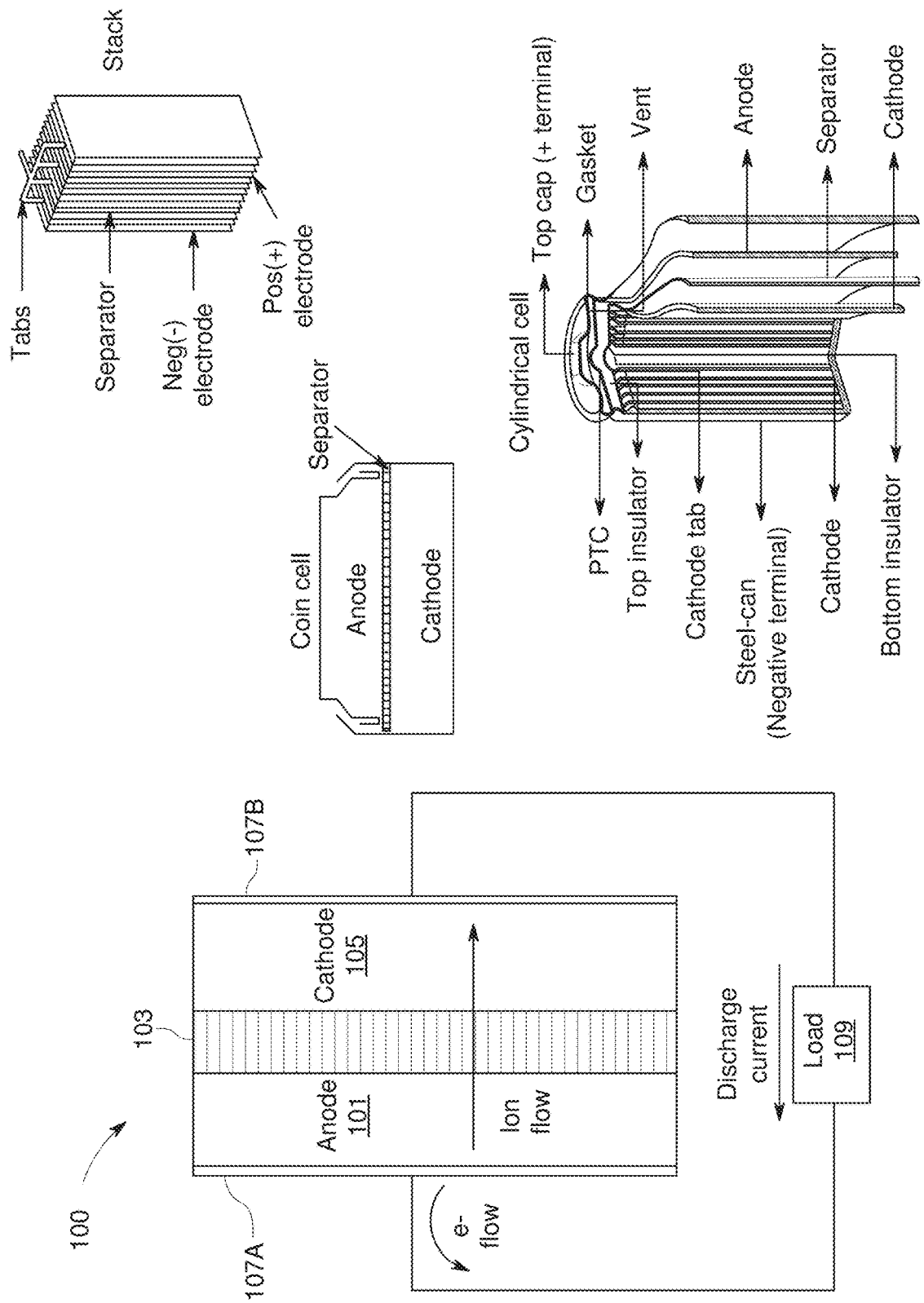
FIG. 1 is a diagram of a battery, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the electrode coating layer in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or electrode coating layer coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved LiBF4, LiAsF6, LiPF6, and LiClO4 etc. In an example scenario, the electrolyte may comprise Lithium hexafluorophosphate (LiPF6) and lithium bis(trifluoromethanesulfonyl)imide (LiTFSI) that may be used together in a variety of electrolyte solvents. Lithium hexafluorophosphate (LiPF6) may be present at a concentration of about 0.1 to 4.0 molar (M) and lithium bis(trifluoromethanesulfonyl)imide (LiTFSI) may be present at a concentration of about 0 to 4.0 molar (M). Solvents may comprise one or more of ethylene carbonate (EC), fluoroethylene carbonate (FEC) and/or ethyl methyl carbonate (EMC) in various percentages. In some embodiments, the electrolyte solvents may comprise one or more of EC from about 0-40%, FEC from about 2-40% and/or EMC from about 50-70% by weight.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the electrode coating layer used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the electrode coating layer for the cathode or anode. Silicon anodes may be formed from silicon composites, with more than 50% silicon, for example.

Si is one of the most promising anode materials for Li-ion batteries due to its high specific gravimetric and volumetric capacity and low lithiation potential (<0.4 V vs. Li/Li+). Upon lithiation, Si anodes deliver high specific capacity (e.g. ca. 3572 mAh/g for Li15Si4), which is particularly attractive for developing high capacity, high energy density, and light weight Li ion batteries.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an electrode coating layer or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

As discussed in the present disclosure, lithium-ion batteries with silicon-dominant anodes show much higher rate performance compared to graphite anodes, with ~10 C charge rates possible.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Although there has been a significant amount of effort to develop silicon anodes, the primary focus of developing these anodes is in dealing with the following three key issues: 1) silicon nanoparticles—the majority of the silicon-based anodes that have high silicon content use silicon nanoparticles to alleviate the large volume expansion. Nanosilicon is expensive and generally requires special processing methods to prepare in large scale, which are not cost effective for large scale battery manufacturing; 2) carbon additives—typical Si anode fabrication involves the use of carbon additives and binders that required organic solvents. These solvents are toxic and required solvent recovery systems to minimize the adverse effect on the environment. Thus, compared with graphite anodes, which uses water as the solvent, Si anode production is generally more expensive; and 3) non-conducting binder material—the final anode formulation still contains non conducting polymeric binder that does not contribute to the electrochemical performance. As a result of this "dead weight" of the binder, the improvement of gravimetric energy density of the resulting cells may be limited.

As discussed above, compared with graphite anodes, Si shows a significant volume change during lithiation and de-lithiation, which leads to pulverization of Si based anodes. Thus, having a mechanically robust and electrochemically stable anode is desirable for improving the performance of Si anodes. The high-capacity fade of Si based anodes is directly related to the large volumetric expansion of Si during the charging and discharging (~400%). As a result of pulverization, Si forms electrically isolated islands within the electrode. Continuous decrease of the utilization of Si leads to rapid capacity decay over long term cycling. Additionally, the stress and strain developed in Lithium silicide (LixSi) disrupts the SEI layer on Si particles resulting continuous formation of new SEI layer. To meet the high energy demand of EV (Electric Vehicle) industry for lighter batteries with longer driving range and cycling life, focus has been on improving performance of Si anodes.

Among the recent advancements in silicon-based anode development, one is the direct coated anode using organic solvent-based binders followed by heat treatment to convert the binder into a carbon matrix. However, use of the organic solvents is problematic, as discussed above. In the present disclosure a direct coated anode using aqueous-based binders followed by heat treatment to convert the binder to carbon matrix is disclosed. The present disclosure addresses the following key advancements: 1) use of environmentally friendly solvent (water) to allow safer, cheaper and faster processing and scalability, specifically anode roll-to-roll fabrication; 2) Si dominant anodes with high Si content (>70 wt. %) for high capacity; and 3) the development of Si dominant anodes free of non-conducting binders capable of fast charging (>2 C), i.e. anodes that contain only carbon and silicon. Although solvent-based anodes have had some effectiveness in improving cycle performance, these anodes may have weak adhesion to the current collector and contain non-continued carbon media that leads to unacceptable performance. Also, although the introduction of carbon additives can somewhat improve the conductivity of the anode, the existence of carbon additives may weaken the adhesion of anode materials to the current collector. Thus, the binder plays an important role in improving the performance of silicon anodes.

Currently, polymeric binders may be used in anode technologies to maintain the integrity of the anode during excessive volume changes during lithiation. For example, polyvinylidene difluoride (PVDF) is commonly used as a binder in graphite cells, but it is not capable of handling the excessive volume changes of silicon. Additionally, PVDF is soluble only in toxic organic solvents such as NMP, which require solvent recovery systems to recycle the solvent. Binders such as cellulose may also be used in conventional electrodes. However, these binders have not been successfully used in Si dominant anodes since the polymer interconnection between Si and carbon additives are not strong enough for excessive volume changes of Si. Additionally, most of the polymeric binders are soluble only in toxic organic solvents (e.g., NMP).

Some water-based polymers such as carboxymethyl cellulose (CMC), sucrose, poly(acrylic acid) (PAA), poly(vinyl alcohol) (PVA), starch, chitosan, lignin, and gums (e.g., xanthan gum) have been used as binders for preparing Si anodes. However, these polymers have not created a successful binder system that shows superior electrochemical performance and is capable of large-scale production.

In the present disclosure, water-soluble (aqueous-based) PAA-based polymeric binders that are capable of mitigating the capacity fade of Si anodes occurring at a high rate and long-term cycling are disclosed. The PAA-based polymers may be polymer blends that include PAA as the main polymeric matrix while introducing aqueous based polymers as a secondary component. In some embodiments, the PAA may be combined with phenolic resin (PAA-phenolic or PAA-phenolic resin, for short). The processes involve include, but are not limited to, the steps of synthesizing polymers and optimization of water solubility; creating aqueous based solutions for electrode preparation; carbonization of the water-soluble binder incorporated in Si dominant anode; preparing polymer blends with additional polymer components such as phenolic resin (e.g., creating PAA-phenolic) using water as the solvent and the preparation of slurries with Si; using such slurries for coating of Si dominant anode; electrochemical studies of PAA-phenolic binders with Si dominant anode. The polymer blend binders (such as phenolic-PAA binders) may be used for all different types of Si or SiOx anodes with or without a conductive (e.g. graphite) additive.

In one embodiment, a battery electrode is disclosed where the electrode comprises an electrode coating layer on a current collector, the electrode coating layer formed from silicon and a water soluble PAA-based polymer blend, wherein the water soluble PAA-based polymer blend comprises PAA and one or more additional water-soluble polymer components. In a further embodiment, the one or more additional water-soluble polymer components may be phenolic resin, and the concentration of the phenolic resin in the water soluble PAA-based polymer blend may be <30 wt. %. In further embodiments, the one or more additional water-soluble polymer components comprises a polymer containing one or more functional groups selected from the group consisting of —OH, NH—, $NH_2$, and —COOH. In another embodiment, an electrode is disclosed where the electrode comprises an electrode coating layer on a current collector, the electrode coating layer formed from silicon and a water soluble PAA-based polymer blend, wherein the water soluble PAA-based polymer blend is a tertiary system comprising PAA and two additional water-soluble polymer components. IN a further embodiment, the tertiary system may comprise PAA, phenolic resin and a third water-soluble polymer component.

Water-based anode fabrication is of interest for large scale manufacturing of anodes to reduce the cost and eliminate the use of toxic solvents. Objectives of a water-based anode polymer include: 1) ease of processing—the resin being highly soluble in water allowing for ease of adjusting viscosity during coating; 2) high carbon yield and film-forming properties upon pyrolysis to create a conductive matrix around and between silicon particles; 3) a homogeneous distribution of polymeric components in water and the slurry without phase separation during the slurry formulation or coating; and 4) possessing a relatively low pyrolysis temperature that is compatible with the thermal behavior of the associated current collector. Carbonization or pyrolyzation temperature may be temperatures 200-1084° C. (melting point of copper). In some embodiments, the pyrolyzation temperature may be temperatures 400-1000° C. In other embodiments, the pyrolyzation temperature may be temperatures 400-800° C. The atmosphere for pyrolysis may be a single gas or mixture of inert or reactive gas or gases.

Some commercially available water-soluble polymers have significantly low carbon yield (<10 wt. %) and develop microcracks during pyrolysis. As a result, those water-soluble polymers exhibit poor mechanical properties in the anode after pyrolysis. Therefore, these polymers are not suitable for achieving mechanically stable Si dominant anodes after carbonization. Polymer resins and their derivatives with high carbon yield upon pyrolysis are desired to yield a continuous carbon medium while keeping the robustness of the anode. Although available polymers and their blends may be capable of achieving a high char yield, most of these polymers are insoluble in water. PAA itself has a very low char yield, i.e. pyrolytic carbon yield is ~<5-15% upon pyrolysis. Thus the significant loss of the material upon pyrolysis is a challenge when using it as a precursor to generate a pyrolyzed carbon binder.

Carbon media presence in the anode matrix plays a crucial role in physical and electrochemical stability of the Si dominant anodes. In the present disclosure, a commercially viable Si dominant anode that contains a carbon matrix that acts as both the binder and the conducting agent is disclosed (this is sometimes referred to as a "binder-free" anode as there is no separate binder). Elimination of non-conducting binder significantly improves the cycling performance and high-rate capabilities while keeping the mechanical integrity of the anode. Making anodes using aqueous-based polymers and subsequent conversion of the polymer to carbon source can reduce the cost and improve the Si anode performance.

In the present disclosure, water-soluble polymeric binder materials are described. These water-soluble polymeric binders allow for preparation of "binder-free" anodes and have the following advantages:

1) Easy to process: The polymer/polymeric blend may be highly soluble in water allowing for ease of optimizing rheological properties of the slurry.
2) High carbon yield and retaining electrode structure upon pyrolysis: The carbon matrix may provide conductive pathways around and between Si particles.
3) Fully miscible: The nature of the miscibility of the polymeric components in water allows for creation of the slurry without phase separation during the slurry preparation, coating and drying.
4) Favorable pyrolyzation temperature: Possess a relatively low pyrolyzation temperature to avoid thermal decomposition/the loss of mechanical properties of the current collector.

Polymers are created from monomers and the molecular weight (MW) of a polymer is based on the identity of the monomer and the number of monomers present in the polymer molecule. Polymer molecular weights are usually given as averages and may fall in a distribution. The MW distribution determines the properties of the polymer. In the measurement of the average MW, the two most common ways to measure are Mn, number averaged MW, and Mw, weight averaged MW (midpoint of the distribution in terms of the number of molecules). Polydispersity of a polymer (Mw:Mn ratio) describes the distribution width. Other ways to calculate MW include viscosity average molecular weight (Mv), and higher average molecular weight (Mz, Mz+1). The choice of method for polymer molecular weight determination depends on factors such as cost, experimental conditions and requirements. Degree of polymerization is also often used in discussing polymers; this is the average number of monomeric units per molecule.

In this disclosure, a PAA-based polymer binder is described that has the following features:

1) Blend of two or more polymer compounds.
2) Fully water soluble (aqueous-based) and does not separate after introduction of Si and water.
3) Has high char yield after carbonization.
4) Able to form a stable, Si dominant anode after carbonizing binder and Si mixture.

In the present disclosure, water soluble PAA-based binders are described that are made by starting with the primary component of poly(acrylic acid) (PAA) as shown below:

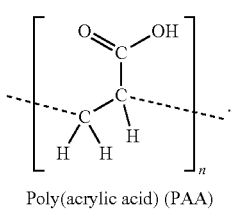

Poly(acrylic acid) (PAA)

The presently disclosed PAA-based polymer binders are a blend that contains one or more additional water-soluble polymer components in addition to the PAA. In some embodiments, a resin is utilized as the secondary component in the blend; this component may contain phenolic type resins such as resol (other inorganic materials such as salts may also be present) to improve the water solubility and water tolerance (the highest amount of water that can be introduced before phase separation). These phenolic type resins are capable of crosslinking with water-soluble polymer derivatives containing hydrophilic functional groups such as PAA. The use of secondary or tertiary water-soluble polymeric components can significantly improve the stability of the PAA-based polymer blend compared to unmodified resins. PAA alone (without a secondary or tertiary polymer added) has low carbon yield and shows significant loss of the weight of PAA at high temperatures (>200° C.). Therefore, introducing a high char yield polymer, such as a phenolic resin (>50% or >60% or >70%) to the PAA solution results in a polymer blend (PAA-phenolic) that has a much higher char yield (amount of pyrolytic carbon) compared to neat PAA polymer.

As discussed above, neat PAA polymer primarily undergoes thermal decomposition reactions (releasing H₂O and gaseous products) at high temperature (pyrolysis). However, the creation of a polymer blend by utilizing PAA plus additional polymers including, but not limited to, phenolic resins, may bypass the direct decomposition of PAA and initiate polycondensation reactions between the phenolic resin and PAA before pyrolysis. This reaction may be important to form a new covalently bonded polymer (formed from the reaction between the PAA and the phenolic resin) that can generate higher char-yield and a more stable carbon matrix upon pyrolysis. This new polymer may also combine, mix, or further react with any excess PAA through a further polycondensation reaction.

Figure 7:
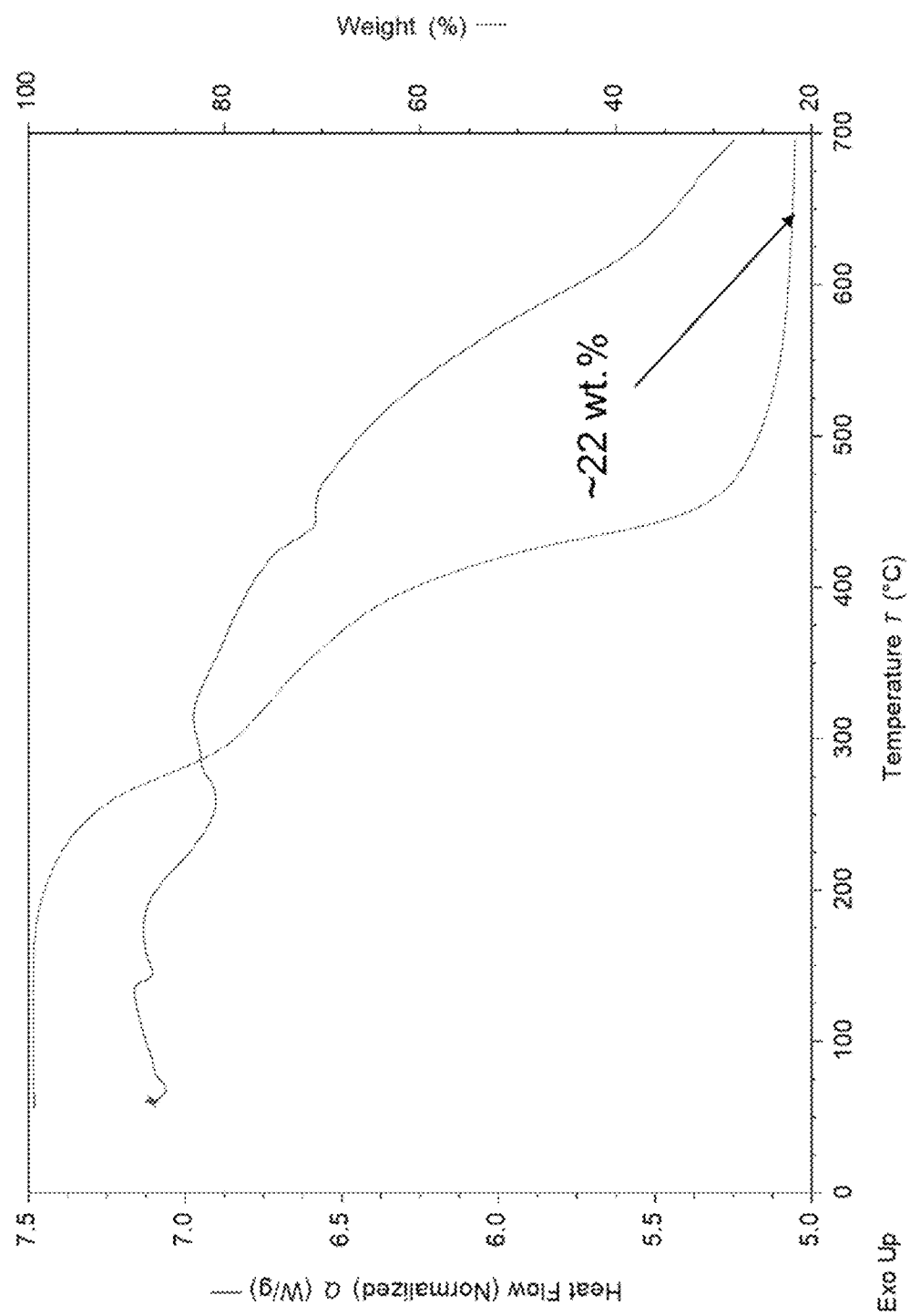
FIG. 7 shows TGA data illustrating the char yield of a phenol-PAA polymer blend, in accordance with an example embodiment of the disclosure.

One such polymer blend of water soluble PAA and phenolic resin may yield a pyrolytic carbon>20 wt. % (See FIG. 7). When controlling the ratio of PAA:phenolic resin, the pyrolytic carbon yield may vary between 20-50 wt. % or >50 wt. %. This combination of PAA and phenolic resin results in higher char-yield than that of neat PAA upon pyrolysis, which in turn may be more cost-effective. Also, the PAA and phenolic resin blend may generate a more mechanically stable carbon matrix upon pyrolysis that can hold active materials together during electrochemical cycling. This may provide better mechanical strength due to increased stability of the matrix.

In one embodiment, a binder-free Si dominant (>70 wt. %, >50 wt. %) electrode is fabricated using a slurry of a water-soluble polymer blend including PAA as the main component plus a secondary polymer component of phenolic/resol polymer resin. The polymer blend serves as both the binder and carbon matrix. These water-based anode slurries may possess high viscosity and can be further optimized. The resulting Si anodes retain their stable electrode structure upon heat treatment/pyrolyzation/carbonization. The amount of phenolic content can be <50 wt. %, <40 wt. %, <30 wt. %, <2 wt. % or <10 wt. % w.r.t the total weight of the polymer blend.

Among other polymer derivatives that may be used as a secondary or tertiary component in a water soluble PAA-based binders, phenolic resins are particularly attractive since they have high molecular weight and high char yield, which are ideal properties for adoption as binders for silicon anodes. Phenolic resins (or phenol formaldehyde resins (PF)) include synthetic resins such as those obtained by the reaction of phenols with formaldehyde. Phenolic resins are divided into two main types, novolacs and resols. Novolacs are phenol-formaldehyde resins made when the molar ratio of formaldehyde to phenol is around one or less than one. Resols are phenol-formaldehyde resins are made with a formaldehyde to phenol ratio of greater than one (usually between about 1.2-2, in some embodiments, around 1.2-1.7). Ortho, meta and para linkages are contemplated, as well as linear and branched structures. Phenolic resins can have different molecular weights and degrees of polymerization depending on the reaction condition.

Novolac phenolic resins (may also be referred to as a phenolic/novolac type polymer) have phenolic units mainly linked by methylene groups. Water soluble novolac resins with different molecular weights may be used as a secondary polymer in the water soluble PAA-based binders. An example structure of a novolac phenolic resin is shown below (I):

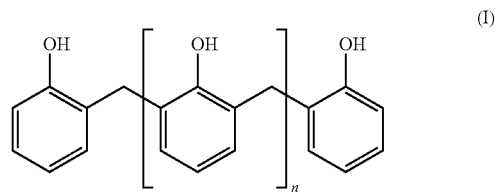

(I)

In some embodiments, n may be >5; in other embodiments, n may be >10, >50, >100, >500 or >1,000. Branched novolac types such as phenol-crotonaldehyde-resorcinol resins are also contemplated.

Resol phenolic resins (may also be referred to as a phenolic/resol type polymer) may have methylene and/or ether bridges and have unreacted hydroxymethyl (—CH₂OH) groups. In some embodiments, the number of units in the resin may be >5; in other embodiments, the number of units may be >10, >50, >100, >500 or >1,000. An example structure of a resol phenolic resin is shown below (II):

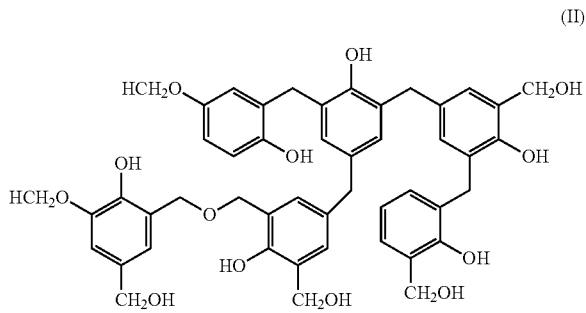

(II)

However, most phenolic resins typically do not readily dissolve in water but are soluble in alcohol and ketones. Some resol resins may be slightly soluble, but the solubility is generally low. Some water-soluble phenols have very low water tolerance that leads to the formation of a separated polymer phase with the addition of water and/or precipitation of the polymer after exceeding the phenolic:water weight ratio. This may be an obstacle to water-based processing. Further reaction (e.g. derivatization) of the polymer backbone may alleviate these problems.

As discussed above, the presently disclosed PAA-based polymer binders are a blend that contains one or more additional water-soluble polymer components in addition to the PAA. This combination improves the properties of the binder, including improving the miscibility of the additional polymer components within the PAA polymer matrix and optimizing the viscosity of the resulting slurry. The PAA-based polymer binder may undergo two or more different stages of chemical changes between the components, such as (1) Van Der Waals type interaction (hydrogen bonding); and (2) thermal curing, where polycondensation reactions take place.

In one embodiment, PAA-based polymer binders may be a blend of PAA and phenolic resin. During initial mixing, the phenolic resin (polymer) and PAA form a miscible polymer blend. The phenolic polymer and PAA both form hydrogen bonds (H-bonds) resulting in a stable polymeric blend. Then the as-prepared polymeric blend may be used as a binder for preparing an electrode slurry with Si. These strong Van der Waals forces facilitates the formation of mechanically robust green anodes that can be processable in both roll-to-roll and punched forms.

Figure 2:
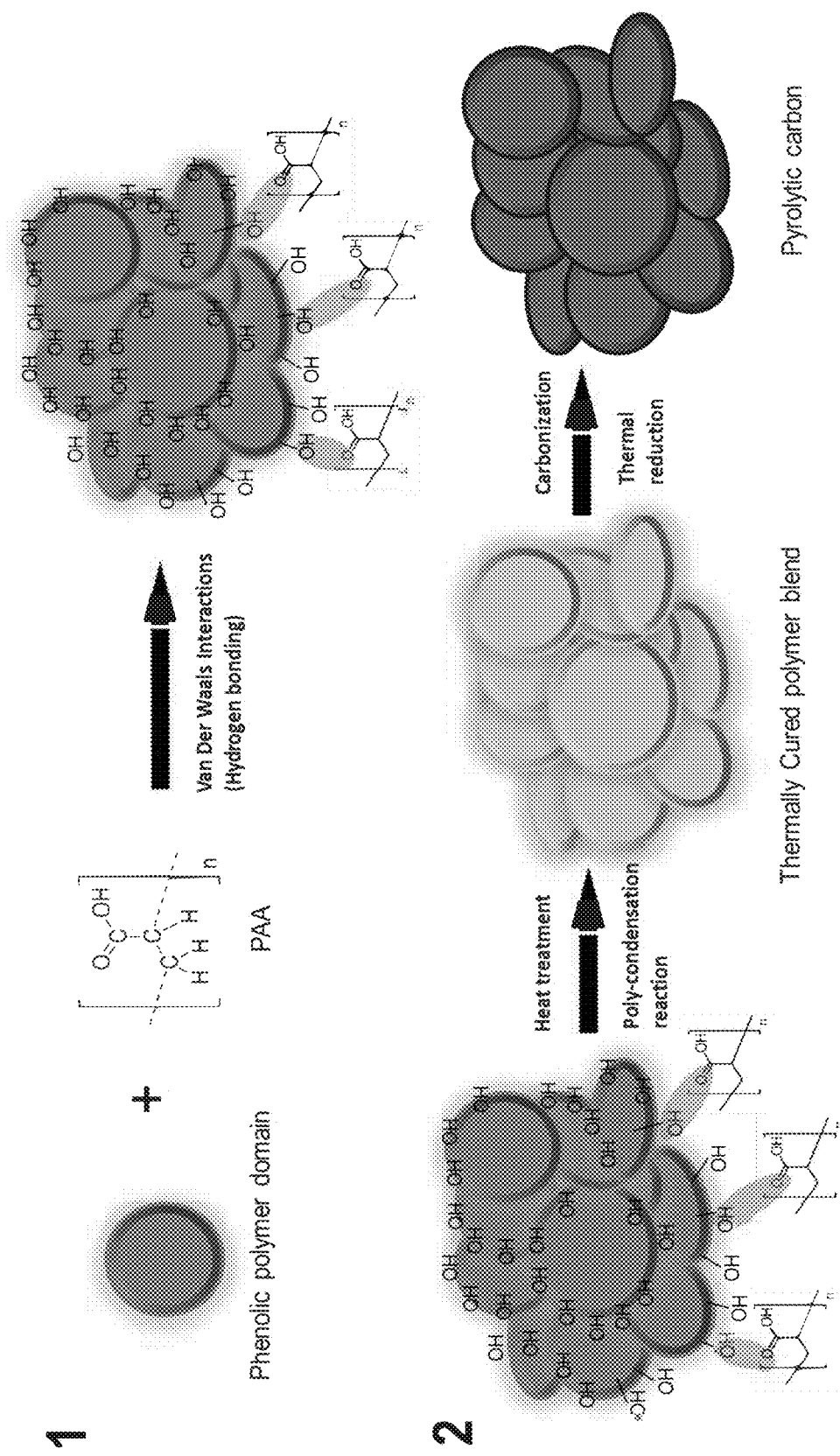
FIG. 2 illustrates the two step interaction of PAA with phenolic resins to form a polymeric blend, which is then used as a binder, and the further carbonization step to create the conductive matrix, in accordance with an example embodiment of the disclosure.

Further reaction of the blend may form covalent bonds. In one example, the PAA-phenolic resin blend described above may undergo a polycondensation reaction upon slow rate heat treatment, which the PAA-phenolic resin blend is converted to a co-polymeric form that has chemical bonds between the PAA and the phenolic resin polymer components (nominally forming a co-polymer). At elevated temperatures thermal decomposition of the co-polymeric form leads to formation of partially reduced pyrolytic carbon. See FIG. 2.

Further, in the presence of Si, in addition to polycondensation reactions, phenolic-PAA polymer blends may chemically interact with Si—O on the surface of Si particles. The nature of strong chemical bonds that are formed between the polymer components and the Si-polymer is controlled by the thermal curing (heating rate) stage.

Figure 3A:
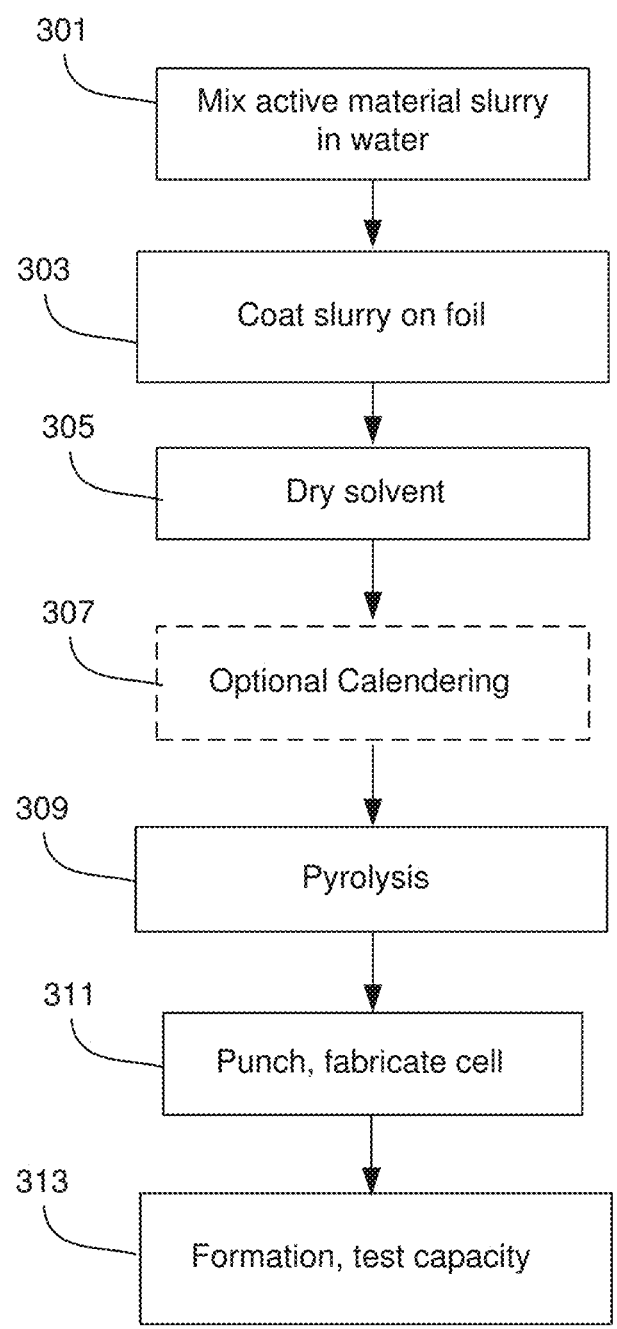
FIG. 3A is a flow diagram of a direct coating process for fabricating a cell with a silicon-dominant electrode, in accordance with an example embodiment of the disclosure.

FIG. 3A is a flow diagram of a direct coating process for fabricating a cell with a silicon-dominant electrode, in accordance with an example embodiment of the disclosure. This process comprises physically mixing the electrode coating layer and conductive additive together, and coating it directly on a current collector as opposed to forming the electrode coating layer on a substrate and then laminating it on a current collector. This strategy may also be adopted by other anode-based cells, such as graphite, conversion type anodes, such as transition metal oxides, transition metal phosphides, and other alloy type anodes, such as Sn, Sb, Al, P, etc.

In step 301, the raw electrode coating layer may be mixed in a slurry comprising, e.g. a PAA-phenolic resin blend polymeric binder. In the mixing process, the active material may first be mixed, e.g., the binder, a solvent, and conductive additives, if any. Then, silicon powder with a 1-30 or 5-30 µm particle size may then be dispersed at e.g., 1000 rpm for, e.g., 10 minutes, and then the slurry may be added and dispersed at, e.g., 2000 rpm for, e.g., 10 minutes to achieve a slurry viscosity within 1500-4000 cP and a total solid content of about 30-40 wt. %.

The particle size (nano to micro) and mixing times may be varied to configure the electrode coating layer density and/or roughness. Furthermore, cathode electrode coating layers may be mixed in step 301, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 303, the as-prepared slurry may be coated on a copper foil, 20 µm thick in this example, and in step 305 may be dried at 130° C. in a convection oven to dry the coating and form the green anode. Similarly, cathode electrode coating layers may be coated on a foil material, such as aluminum, for example.

An optional calendering process may be utilized in step 307 where a series of hard pressure rollers may be used to finish the film/substrate into a smoother and denser sheet of material.

In step 309, the electrode coating layer may be pyrolyzed by heating to 500-800° C., 650° C. in this example, in an inert atmosphere such that carbon precursors are partially or completely converted into conductive carbon. The pyrolysis step may result in an anode electrode coating layer having silicon content greater than or equal to 50% by weight, where the anode has been subjected to heating at or above 400 degrees Celsius. In some embodiments, lower temperatures may be used.

Pyrolysis can be done either in roll form or after punching in step 311. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 313, the cell may be subjected to a formation process, comprising initial charge and discharge steps to lithiate the anode, with some residual lithium remaining, and the cell capacity may be assessed. The fabricated anode shows superior adhesion to copper, a remarkable cohesion, and exceptional flexibility. This anode is shown to be capable of fast charging and performs similar or better than current anodes.

Figure 3B:
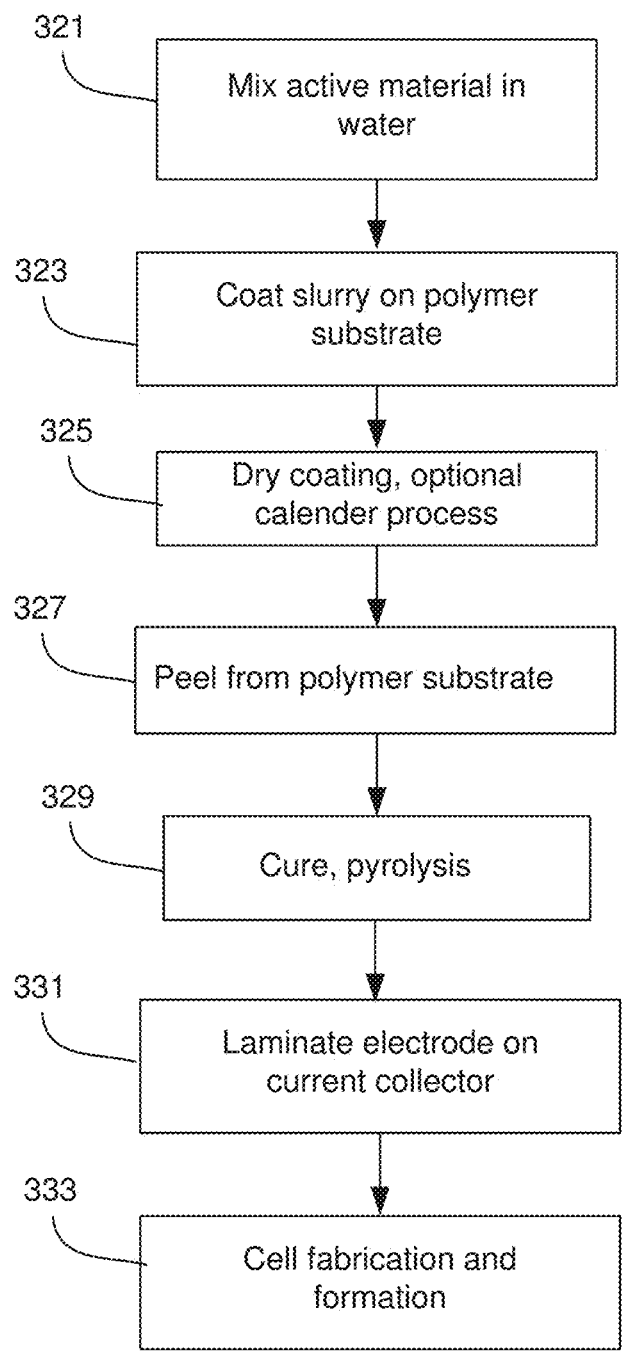
FIG. 3B is a flow diagram of an alternative process for lamination of electrodes, in accordance with an example embodiment of the disclosure.

FIG. 3B is a flow diagram of an alternative process for lamination of electrodes, in accordance with an example embodiment of the disclosure. While the previous process to fabricate composite anodes employs a direct coating process, this process physically mixes the active material, conductive additive if desired, and binder together coupled with peeling and lamination processes.

This process is shown in the flow diagram of FIG. 3B, starting with step 321 where the raw electrode coating layer may be mixed in a slurry comprising phenolic-PAA polymeric binders. For example, PAA forms polymer blends readily with phenolic resins in DI water without gelling/phase separation and creates a viscous aqueous solution that can be directly used for preparing the anode slurry.

The particle size and mixing times may be varied to configure the electrode coating layer density and/or roughness. Furthermore, cathode electrode coating layers may be mixed in step 321, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 323, the slurry may be coated on a polymer substrate, such as polyethylene terephthalate (PET), polypropylene (PP), or Mylar. The slurry may be coated on the PET/PP/Mylar film at a loading of 3-6 mg/cm2 for the anode and 15-35 mg/cm2 for the cathode, and then dried in step 325. An optional calendering process may be utilized where a series of hard pressure rollers may be used to finish the film/substrate into a smoothed and denser sheet of material.

In step 327, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 329 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 331, the pyrolyzed material may be flat press or roll press laminated on the current collector, where for aluminum foil for the cathode and copper foil for the anode may be pre-coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector.

In step 333, the electrodes may then be sandwiched with a separator and electrolyte to form a cell. The cell may be subjected to a formation process, comprising initial charge and discharge steps to lithiate the anode, with some residual lithium remaining, and testing to assess cell performance.

In accordance with the disclosure, PAA may be reacted with phenolic resins such as (I) or (II) above, which significantly increases their solubility in water. The reaction creates a phenolic-PAA polymeric blend, which can be used in fabricating an electrode, for example, by the procedures above.

Anodes fabricated using these binders are capable of fast charging and may show improved cycling performance compared to the current technologies, which use binders that are only soluble in organic solvents.

Poly(acrylic acid) (PAA) may be reacted with phenolic resin type polymers in ratios where the ratio of phenolic:PAA may be from about 1:1 to about 1:10. In some embodiments, the ratio of phenolic:PAA may be from about 1:1 to about 1:5; in other embodiments, the ratio of phenolic:PAA may be from about 1:1 to about 1:3. In one embodiment, the phenolic:PAA ratio may be about 1:2.45 (e.g. Table 1) and in another embodiment, the phenolic:PAA ratio may be about 1:3.67 (e.g. Table 2).

Solutions of PAA in water are used for the reaction and the concentration may be from about 2 wt % to about 20 wt %. In some embodiments, the wt % of the PAA in water is from about 5 wt % to about 15 wt %; in other embodiments, the wt % of the PAA in water is from about 10 wt % to about 15 wt %.

In a preferred embodiment, the solid content of the starting phenolic resin in H$^2$O (as received) may be >50 wt. % and the PAA solution may be <50 wt. % to avoid the phase separation between the phenolic resin and the PAA. In a further preferred embodiment, the composition of the phenolic resin may be <30 wt. % of the total phenolic-PAA polymer blend, to achieve a slurry viscosity 1500-2000 cps. Further, when making the electrode slurry, mixing of high solid content phenolic resin solutions (in water) into low solid content PAA solutions (in water) prior to adding Si may be preferred as this facilitates the formation of a miscible phenolic-PAA resin blend.

In one embodiment, a phenolic (resol) resin type polymer (Plenco 15637 aqueous resol resin liquid) may be reacted with poly(acrylic acid) (PAA) in the ratio phenolic:PAA of 1:2.45. The starting wt % of the PAA can be 10%, 20%, or <50% (with respect to the total weight of the final resin composite) in deionized (DI) water. Other water based crosslinked or un-crosslinked phenolic resins may also be used.

An exemplary binder formula for a phenolic resin-PAA polymeric blend is shown in Table 1, below. In this embodiment, 12 wt. % PAA in DI water was used to prepare the polymer blend solution.

TABLE 1

| Phenolic-PAA resin composition used as the binder to prepare aqueous based anodes | |
| --- | --- |
| Phenolic/Resol | PAA |
| 1 | 2.450 |
| Phenolic resin (g) | 10.2 |
| PAA (g) | 166 |

Figure 4:
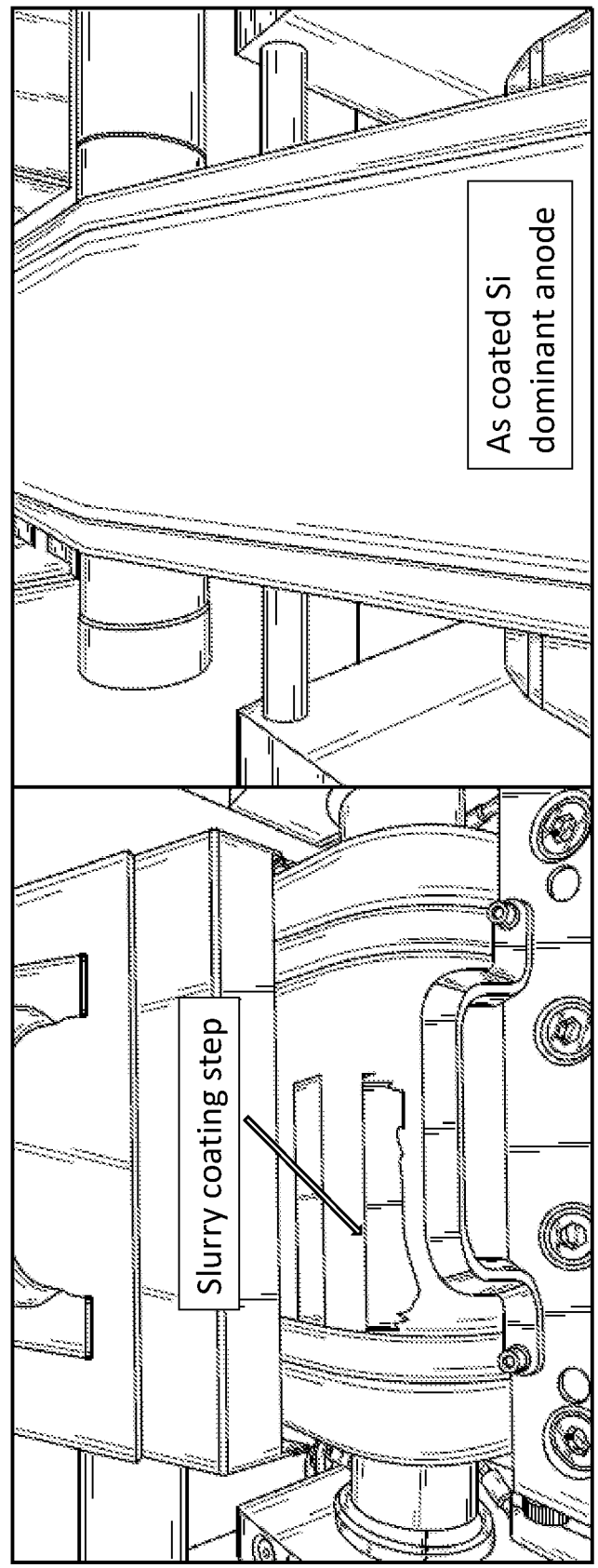
FIG. 4 illustrates roll-to-roll coating of Si dominant anodes using aqueous based PAA-phenolic resin polymer blend and water (as the solvent), in accordance with an example embodiment of the disclosure.

Mixing of PAA with phenolic resin forms polymer blends readily with deionized (DI) water without gelling/phase separation and forms a viscous solution of the polymer binder that can be directly used to prepare the anode slurry. A prepared anode slurry may be used as a coating on Si dominant anodes. In this embodiment (formulation of Table 1), the slurry may be formulated to obtain the final anode composition of Si:Carbon (90:10 W/W) after pyrolysis/carbonization. Roll-to-roll coating of Si dominant anodes can be performed using aqueous based phenolic-PAA polymer blend and water (as the solvent). Green Si anodes may be pyrolyzed at 650° C. for 3 hours under Argon atmosphere. See FIG. 4.

Coated Si anodes show densely packed Si particles that are embedded in the phenolic-PAA polymer blend. SEM images show polymer blend is uniformly distributed among Si particles (FIG. 3). Upon pyrolyzation, the Si anode may become porous and the polymer blend may convert to a carbon matrix, which provides conductive pathways between Si particles and the current collector. See FIG. 5. The as-coated Si anode is denoted as "green anode".

Figure 6:
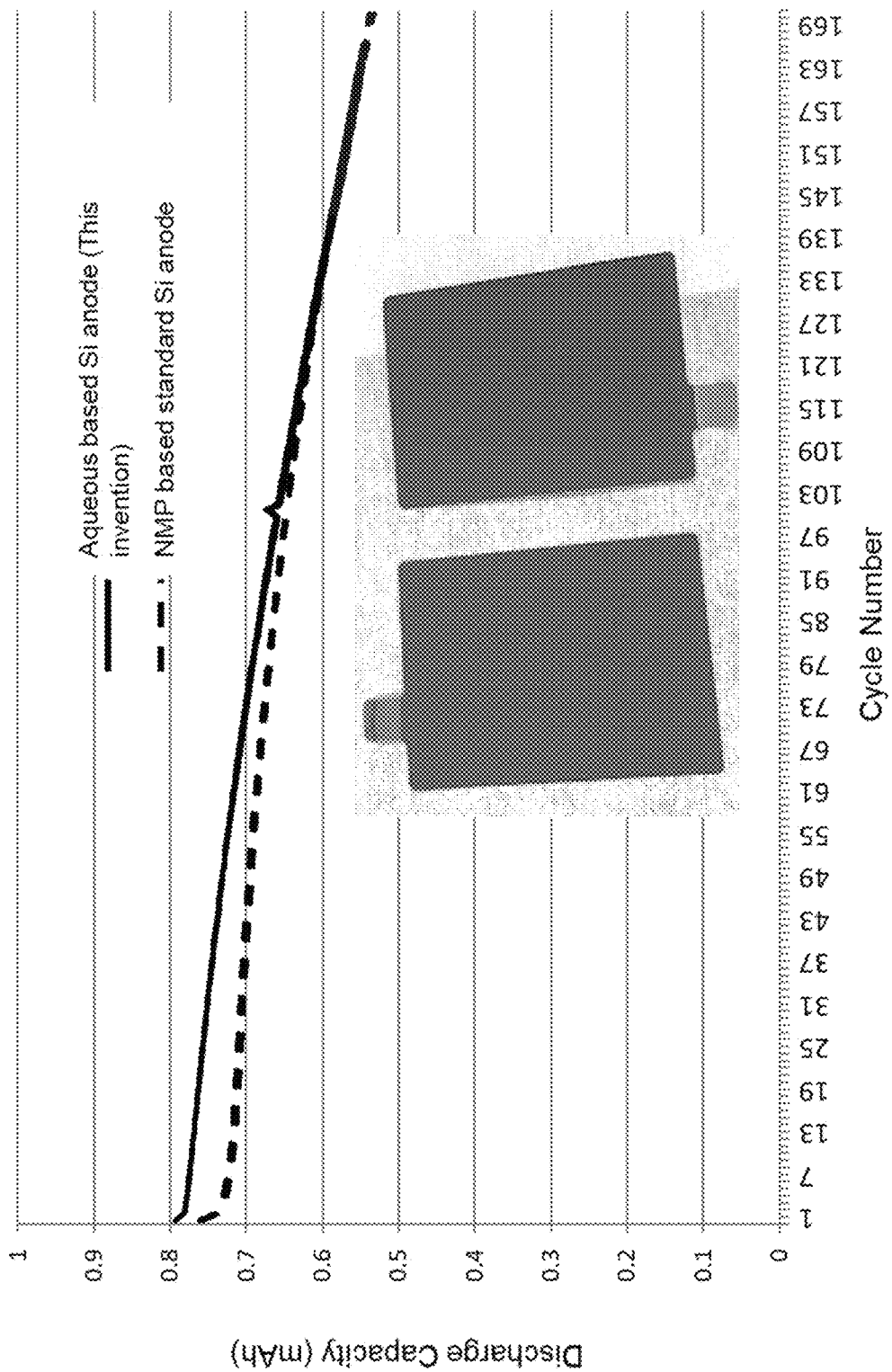
FIG. 6 is a plot comparing the nominal capacity retention of anodes prepared using a water soluble PAA-based polymer binder versus a standard anode prepared using organic solvent, in accordance with an example embodiment of the disclosure. The onset image shows a digital photograph of the final pyrolyzed Si anodes prepared using PAA-phenolic resin binder and water (solvent).

FIG. 6 is a plot showing a comparison of the capacity retention of a standard anode (dotted line) versus an anode prepared using the phenolic-PAA polymer blend (solid line) from Table 1. Cell configuration: Si anode//NCM811 cathode full cells. The plot contains data from 3 cells per group. The onset image shows a digital photograph of the final pyrolyzed Si anodes prepared using the aqueous based phenolic-PAA binder and water (solvent). The anode using the phenolic-PAA binder exhibits higher initial capacity than that of the standard anode. The phenolic:PAA ratio of the binder used to prepare these anodes is 1:2.45 (wt/wt).

TGA data illustrates that the char yield of the phenol-PAA polymer blend from Table 1 at 650° C. is ~22 wt. %. See FIG. 7. As discussed above, this demonstrates the aqueous based phenolic-PAA binder having a much higher char-yield than that of PAA alone.

Figure 5:
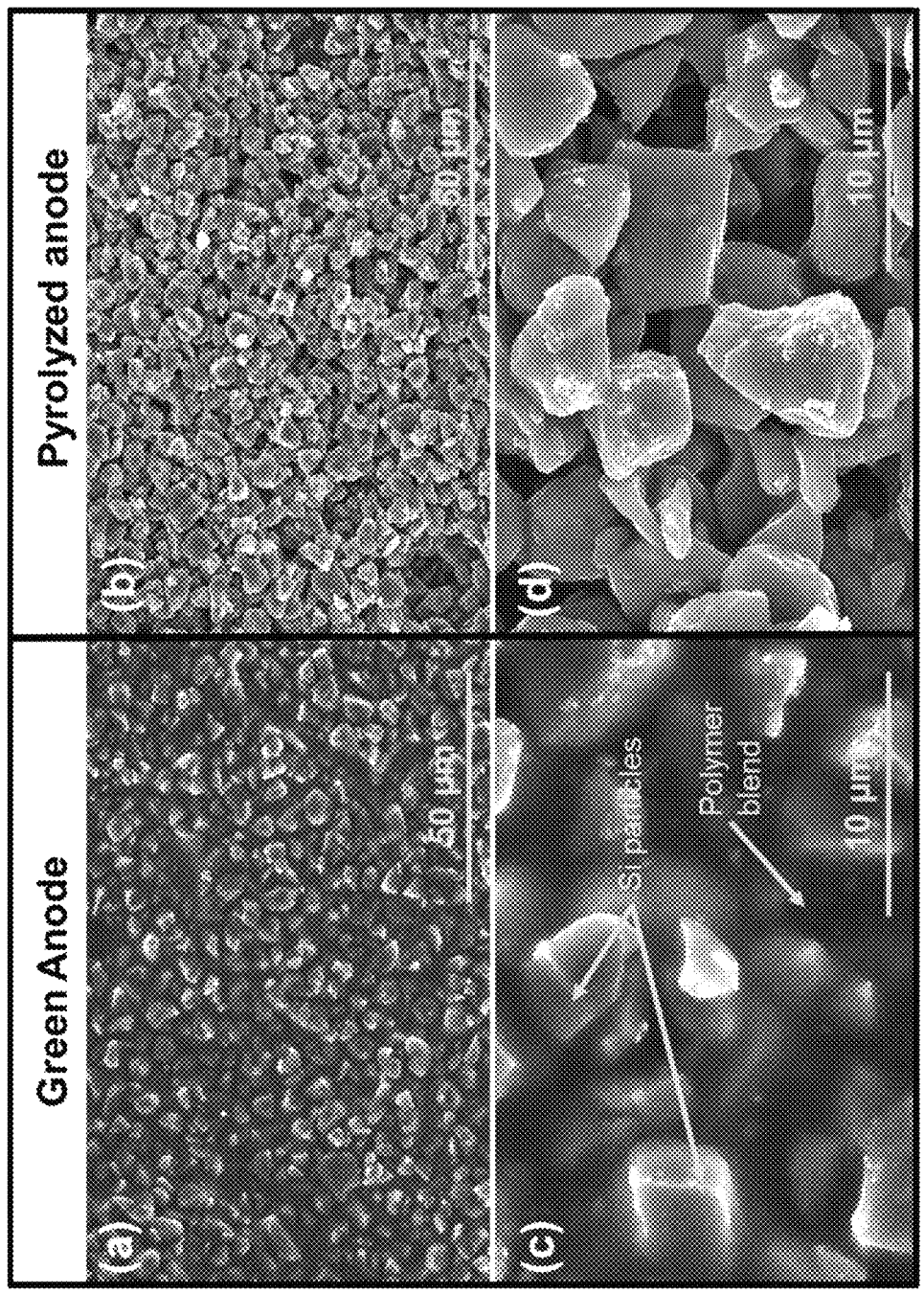
FIG. 5 shows SEM images of the Si anode before (a, c) and after pyrolyzation (c, d), in accordance with an example embodiment of the disclosure. The as-coated Si anode is denoted as "green anode".
Figure 8:
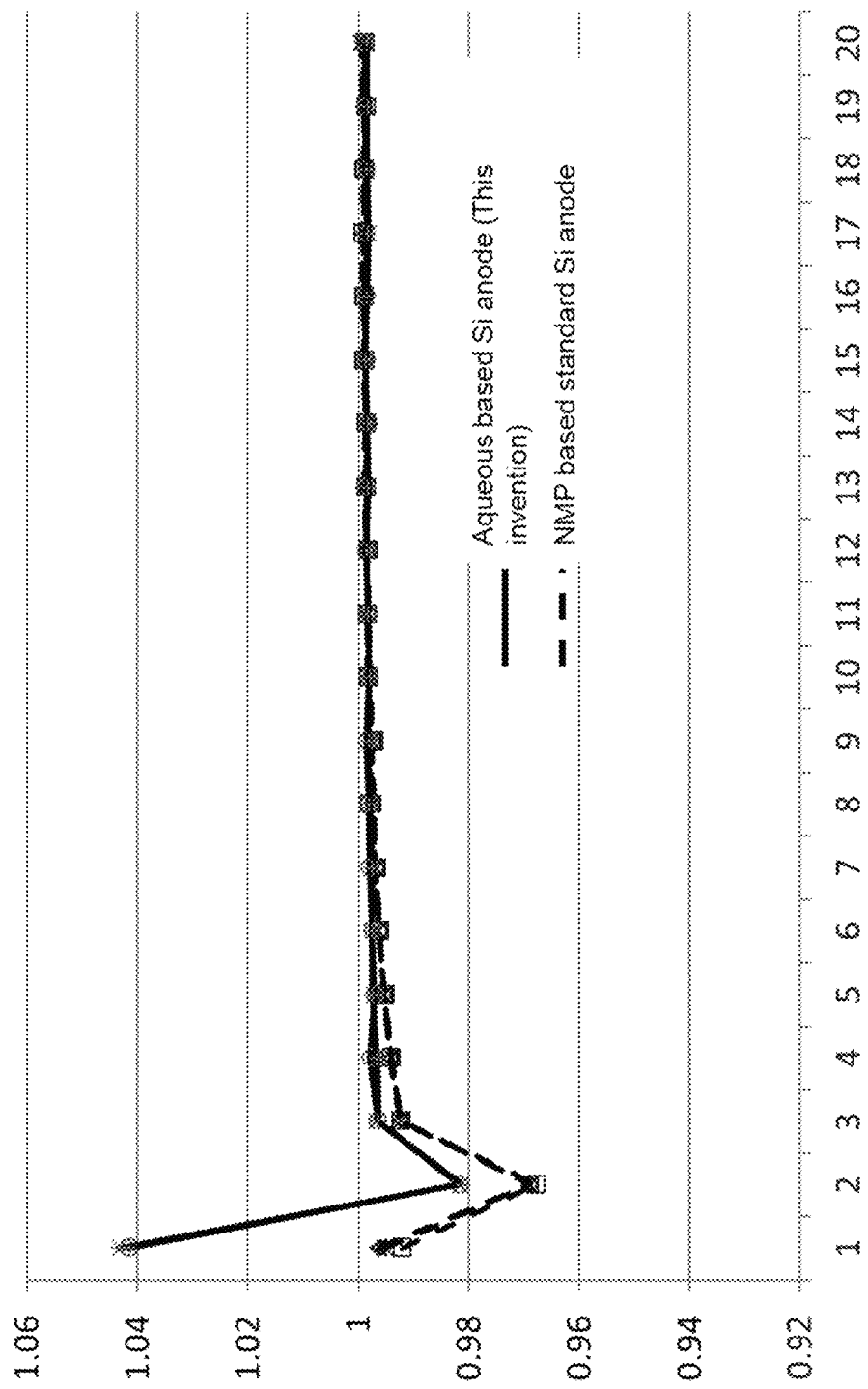
FIG. 8 is a plot comparing the coulombic efficiency of anodes prepared using a water soluble PAA-based polymer binder versus a standard anode prepared using organic solvent, in accordance with an example embodiment of the disclosure.

FIG. 8 is a plot showing a comparison of as prepared Si anodes (Table 1) using aqueous based phenolic-PAA binders compared with a standard Si anode prepared using NMP as the solvent (FIG. 5). The Si anodes prepared using the aqueous based phenolic-PAA binder showed higher coulombic efficiency. Without being bound to the theory or mode of operation, it is believed that this is mainly due to the graphitic nature of the pyrolytic carbon obtained with the phenolic-PAA binder. The plot contains data from 3 cells per group.

In another embodiment, the phenolic:PAA ratio may be increased (more PAA). An exemplary binder formula for a phenolic resin-PAA polymeric blend with a increased ratio is shown in Table 2, below. In this embodiment, 12 wt. % PAA in DI water may be used to prepare the polymer blend solution. In this example, the PAA content of the polymer resin was increased compared to the Example shown in FIG. 6 (and Table 1).

TABLE 2

Phenolic-PAA resin composition used as the binder to prepare aqueous based anodes

| Phenolic/Resol | PAA |
|---|---|
| 1 | 3.670 |
| Phenolic resin (g) | 10.2 |
| PAA (g) | 249 |

Figure 9:
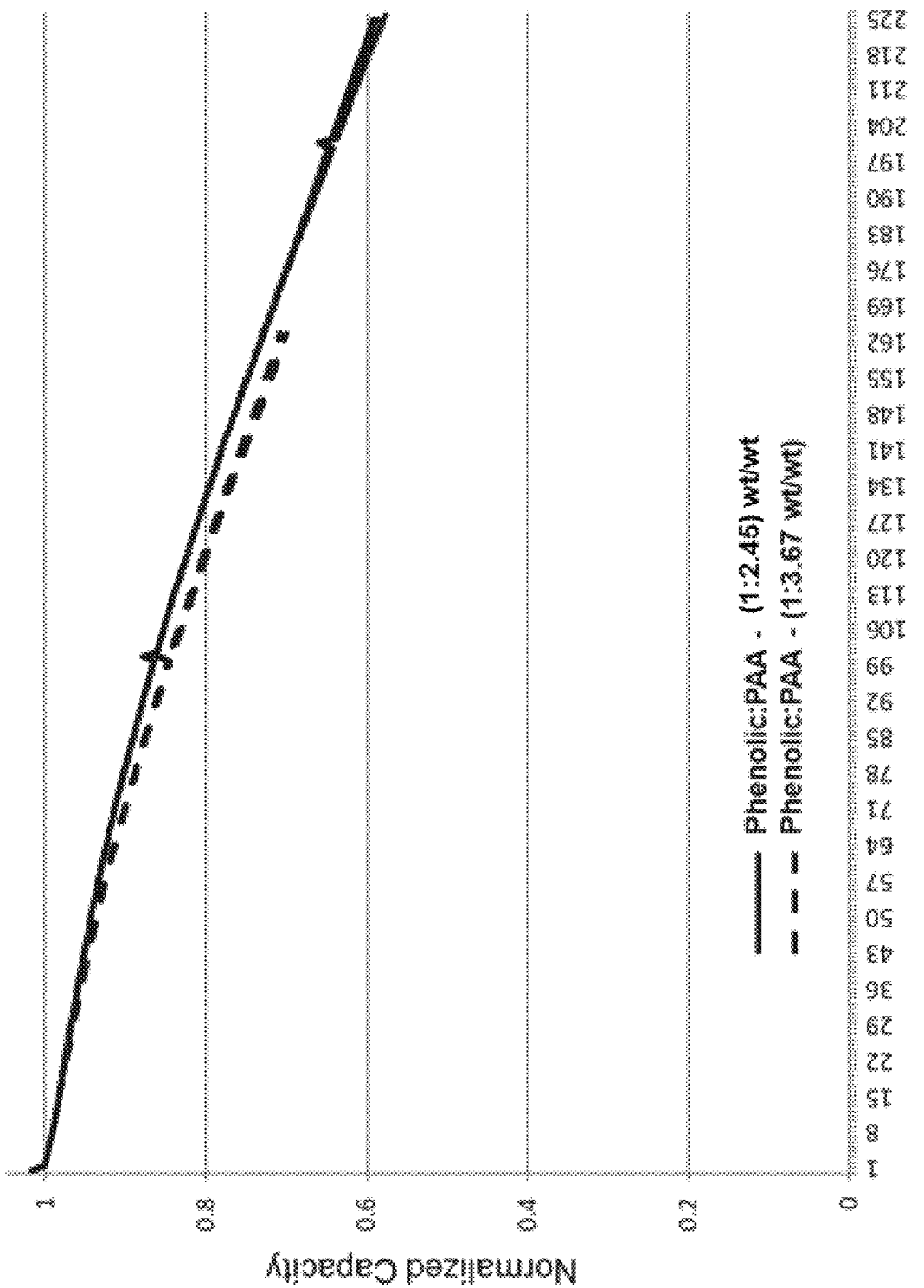
FIG. 9 shows the normalized capacity retention for aqueous based anodes prepared using phenolic-PAA with a 1:3.67 wt/wt ratio as the binder in Si anode as compared to anodes prepared using phenolic-PAA with a 1:2.45 wt/wt ratio, in accordance with an example embodiment of the disclosure.
Figure 10:
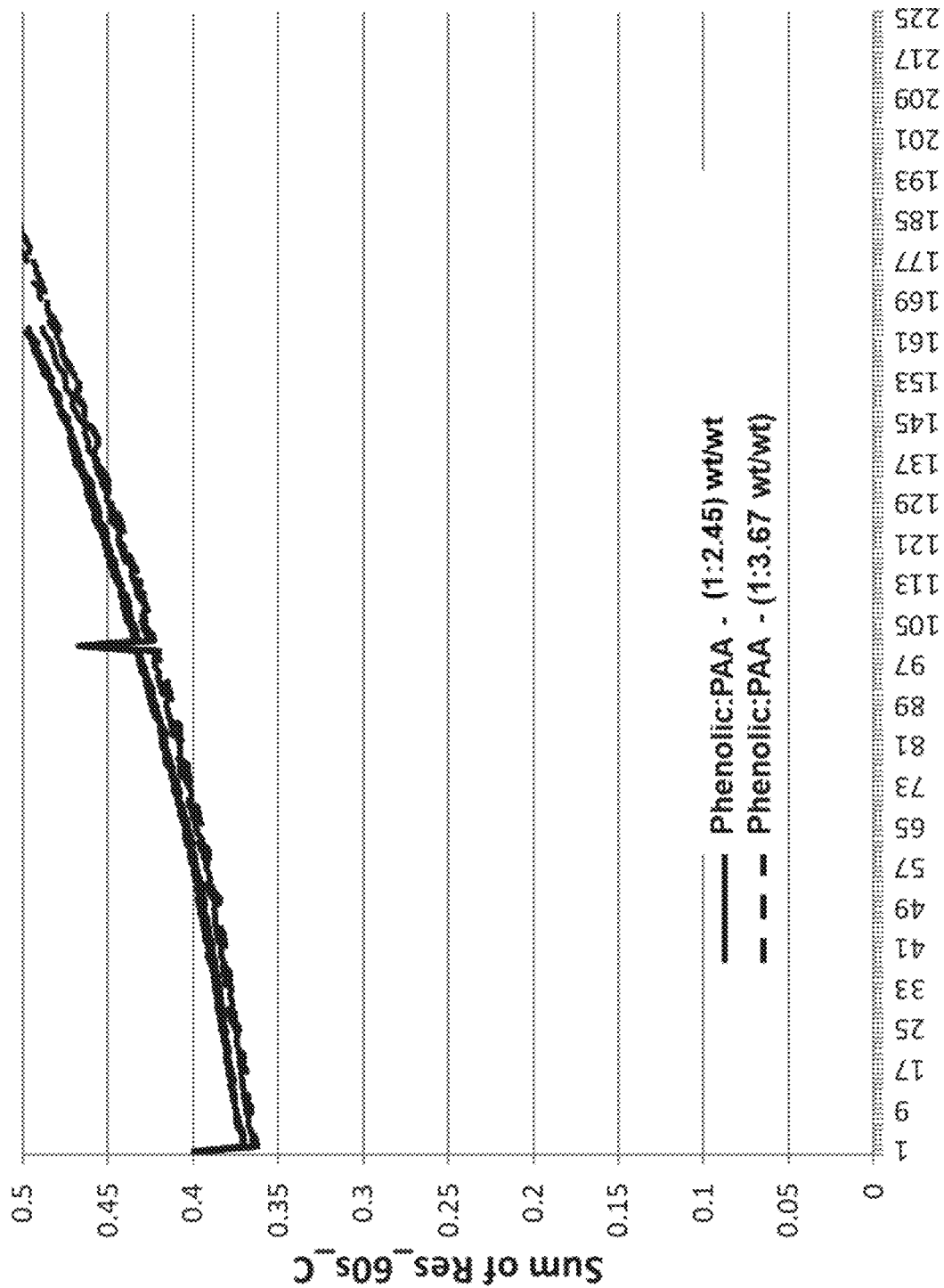
FIG. 10 shows internal resistance for 60 s pulses during charge for aqueous based anodes prepared using phenolic-PAA with a 1:3.67 wt/wt ratio as the binder in Si anode as compared to anodes prepared using phenolic-PAA with a 1:2.45 wt/wt ratio, in accordance with an example embodiment of the disclosure.

In FIG. 9 and FIG. 10, cycling data for aqueous based anodes prepared using phenolic-PAA resin compositions from both Table 1 (1:2.45 wt/wt) and Table 2 (1:3.67 wt/wt) as the binder in Si anode is shown. FIG. 9 shows the normalized capacity retention and FIG. 10 shows the internal resistance for 60 s pulses during charge for aqueous based anodes prepared using phenolic-PAA with a 1:3.67 wt/wt ratio as the binder in Si anode as compared to anodes prepared using phenolic-PAA with a 1:2.45 wt/wt ratio. This data illustrates that increasing the PAA content in phenolic-PAA resin did not adversely affect the anode through resistance. The anodes prepared using higher PAA content in the resin have a slight improvement in the cycle life compared to the anodes prepared using lower PAA content.

The incorporation of more PAA does not adversely affect the cell characteristics. FIG. 10 shows a similar increase in cycling resistance for both versions of resin with phenolic-PAA.

Table 3 compares through resistance values of the Si anodes (after pyrolysis) prepared using two different phenolic-PAA resins having the different phenolic:PAA ratios shown in Tables 1 and 2.

TABLE 3

Resistance values for phenolic-PAA resin based anodes after pyrolysis

| Resin Examples | Resistance of the anodes (Ohm) |
|---|---|
| Phenolic:PAA (1:2.45) | 0.44 |
| Phenolic:PAA (1:3.67) | 0.42 |

In some embodiments, 28.9 wt. % and 21.4 wt. % of phenolic resin was introduced to a PAA solution (12 wt. % in $H_2O$), to create the blends in which the phenolic:PAA resin is 1:2.45 wt/wt and 1:3.67 wt/wt of the total amount of polymer respectively. The presence of PAA helps to form a uniform slurry without phase separation as well as improving the cycling performance.

Other polymers that may be included in the polymer blends (with the PAA) include, but are not limited to, one or more of polyvinyl alcohol (PVA), polyvinylpyrrolidone (PVP), poly aminoacids, polyglycolides (PG), polyethylene glycol (PEG), and co-polymers such as Poly(ethylene-co-acrylic acid). Additionally, PAA may be further reacted and/or a third component may be utilized. In one embodiment, other water based crosslinked or un-crosslinked phenolic resins are used in conjunction with PAA to create water soluble polymer blends for use as binders.

In some embodiments, the polymer blend comprises one, two or more polymeric components, which can be designated as binary, tertiary, or more. In one embodiment, the binder includes PAA, phenolic resin and a third component, creating a tertiary system.

Figure 11:
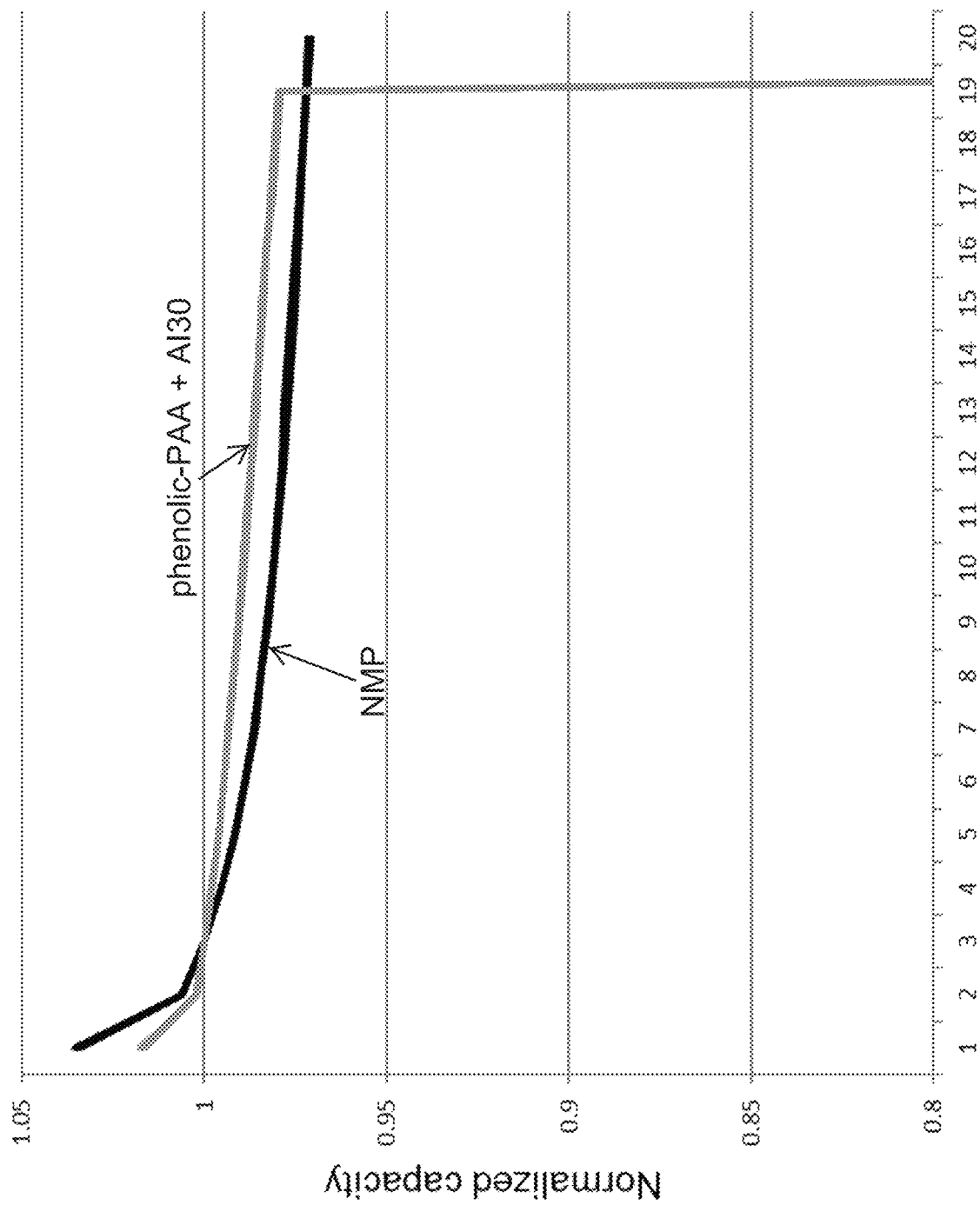
FIG. 11 shows 2 C cycling data for aqueous based anodes prepared using phenolic-PAA+Al30 vs. NMP based anode, in accordance with an example embodiment of the disclosure.

An example of a tertiary system may be made as follows: PAA and phenolic resin (phenolic-PAA) may be combined with aqueous based PAI as a tertiary polymeric component. The PAI component may be Al-30 polymer (Torlon® Al-30 which is a wet polymer granule developed for the performance coating industry comprised mainly of polyamide-imide as the solid), added as ~5 wt. % in the slurry formulation and 1 wt. % w.r.t final anode loading after pyrolyzation. Aqueous based anodes containing Al-30 have shown improved mechanical properties, thus providing improved adhesion and cohesion of the anodes without adversely affecting the cycle life. Fast charging cycling (@2 C) of anodes made from the tertiary polymeric system phenolic-PAA+Al30 showed improved cycling performance compared with NMP based anodes. See FIG. 11 which illustrates the 2 C cycling data for aqueous based anodes prepared using phenolic-PAA+Al30 vs. NMP based anode.

Other polymers used in the blends may comprise reactive functional groups such as —OH, NH—, $NH_2$, —COOH which may be decomposed at a relatively low temperature (below decomposition temperature of phenols).

Decomposable functional groups may generate gaseous byproducts, which may leave additional pore structures within the anode. In some embodiments, the presence of these pores may provide void space required for rapid volume changes of Si during lithiation and de-lithiation. Additionally, these pores may improve electrolyte wettability and ionic conductivity of the anodes.

In additional embodiments, the polymers in the polymer blend (e.g. PAA or other components) may be reacted with further polymer components containing carboxylic acid, alcohol or amine functional groups, which may further improve the adhesion of the anode material to the current collector. Functional groups such as —COOH and —NH$_2$ in combination with phenolic-PAA polymer blend, can promote crosslinking in the polymer blend (by reaction of the functional groups). Crosslinking reactions may be initiated in the presence of an inorganic salt, catalyst or high energy radiation.

The presence of carboxylic acid groups in the binder may participate in surface treatment/roughening of the Cu current collector. Additionally, these functional groups may further improve particle-to-particle interactions which are necessary to retain the electrode structure during pyrolysis and during cycling.

Some polymer components containing acidic functional groups that may be reacted include but are not limited to maleic acid (or maleic acid derivatives) or anhydrides such as maleic anhydride (e.g. Succinic anhydride, Hexanoic anhydride, Propionic anhydride, Myristic anhydride, Acrylic anhydride, (2-Dodecen-1-yl)succinic anhydride, 2,3-Dimethylmaleic anhydride) as illustrated by the structures below:

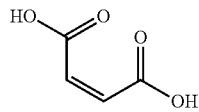

Maleic acid or maleic acid derivatives

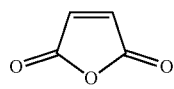

Maleic anhydride or other anhydrides.

Anhydrides rapidly create an acidic group in the presence of water. These organic acids can be added to the slurry as an additive to improve the rheological properties of the slurry and final anode.

Other polymer components that may be used to react include but are not limited to compounds containing amine functional groups (e.g. Chitosan, Poly(allylamine), Polyethylenimine (PEI), JEFFAMINE, Zytel, Selar PA) containing amine functional groups such as NH$_2$ groups as illustrated by the structure below:

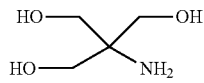

Trizma® base. (Tris(hydroxymethyl)aminomethane).

Other functional aliphatic and aromatic amine compounds of different molecular weights are contemplated.

The other components may react with polymer blend components to make a derivative. In some embodiments, derivatives may be made using groups such as —COOH, and/or —CO—NH$_2$ groups, etc. In some embodiments, the existing polymer backbone(s) may be used for further reactions to make various binder structures. Depending on the specific derivatization and/or blends that are created, water solubility (water tolerability) can be tailored to achieve desired binder properties required for Si anodes. In some embodiments, a phenolic/resol type polymer is used as the starting material.

Polymer blend components such as phenolic resins can be derivatized by reacting, and/or can be included in a polymer blend by addition of polymer additives. The phenolic resin derivatives have increased water solubility. One reaction used to derivatize the phenolic resins is crosslinking. Crosslinking is the process of forming chemical bonds to join (or bridge) two or more polymer chains. Crosslinking can occur when polymers are reacted, either internally, or with other compounds that have functional groups (crosslinking group). Crosslinking can occur by bridging with methyl, ethyl, ether, carboxylate, ester, amide, or any other functional groups that can contribute to form a polymeric network.

In one embodiment of this disclosure, a binder-free Si dominant (>70 wt. %, >50 wt. %) electrode is fabricated using water-soluble derivatives or blends of phenolic polymer resins with PAA. The water soluble derivatives or blends of phenolic polymer resins are created from different water-soluble polymer crosslinkers or additives. These water-based slurries may possess high viscosity and result in high carbon yield upon heat treatment/pyrolysis while retaining the electrode structure.

As discussed above, formaldehyde may be present in a phenolic resin used in a polymer blend for an anode active material slurry, where the degree of the presence of formaldehyde in the phenolic resin may range from 1:0.5 to 1:2 (phenol to formaldehyde) during synthesis. The synthesis of phenolic binders may be tailored to optimize the water tolerance (solubility/dispersibility), solid content, and viscosity of the phenolic resin. The water tolerance of phenolic resin can be 10-80% w.r.t. phenolic resin content before a phase separation in water occurs. Phenolic resin may contain 1-10 wt %, 10-25 wt %, or 25-90 wt %. The amount of binder resin required to achieve the desired carbon wt % after pyrolysis is significantly lowered as the initial solid content and char yield of the phenolic resin-polymer conjugated resin is higher than the common water soluble polymer binders. The water solubility and viscosity of the phenolic resin may be configured to achieve desired slurry viscosity via crosslinking with one or more water soluble polymers. In one embodiment, the water tolerance of a phenolic/resol type polymer can be optimized during synthesis of the polymer, as described above.

In another example scenario, unmodified phenolic resins may be utilized without the aforementioned crosslinking polymers, their derivatives, and their combinations for all different types of Si or SiO$_x$ anodes. Furthermore, the crosslinked polymers, their derivatives, and their combinations may be used without pyrolysis for electrode preparation. The above phenolic resins also can be expanded to use with coated type Si/SiO$_x$. Coating materials can be raging from conductive carbon to ceramic coating. The final slurry prepared using the above may contain secondary electroactive/inactive components that may support the performance of the anode.

Conductive additives which may minimize the isolation of Si particles, such as Super P, carbon black, graphite, graphene, carbon nano/micro fibers, carbon nanotubes, porous (meso/macro) carbons and other types of one-, two-, three-dimensional carbon materials can be introduced into all of the aforementioned binders. Similarly, metallic nano/micro particle, fibers, wires and other types of one-, two-, three-dimensional structures may be introduced into all different aforementioned crosslinked polymers, their derivatives, and their combinations.

Water based crosslinked phenolic resins with high char yield upon pyrolysis at temperatures>200° C. may be utilized with the PAA to create a polymer blend for an electrode binder. These polymer blends can undergo curing before pyrolysis to form a re-arranged polymeric network. The preparation of polymers may comprise many decomposable functional groups such as —OH, NH—, $NH_2$, —COOH at a relatively low temperature, below the decomposition temperature of phenols. These groups can generate gaseous byproducts that can create nano to micro pores within the anode/carbon media. The presence of these pores may facilitate the rapid volume changes of silicon microparticles during cycling as well as electrolyte soaking to improve ionic conductivity of the anodes.

The presence of functional groups such as —COOH and —$NH_2$ may promote the crosslinking with the functional groups in the polymer blends (various —OH and —O—). In addition, in-situ crosslinking via thermal and/or photochemical crosslinking of phenol or phenolic type polymer resins in the presence of a second water-soluble polymer may occur with these materials. The crosslinking reaction may be initiated in the presence of an inorganic salt or catalyst or photochemically.

Strong hydrogen bonds associated with —COOH groups may improve the particle-particle affinity. The existence of strong chemical bonds in the slurry form is utilized to create a carbon matrix that strongly adheres to the particles. New bonds may be formed between particles and the copper surface as a result of decomposition of these functional groups upon pyrolysis.

The as-synthesized polymers may be used to prepare slurries using silicon and the as-synthesized polymers as the binder, followed by doctor blade coating to prepare silicon-dominant anodes. The active material may be pyrolyzed under an argon atmosphere (or any inert atmosphere) to generate silicon-dominant anodes of 50% or greater silicon by weight. In accordance with the disclosure, "active material" may comprise the active material alone, or may encompass an entire electrode coating layer, which includes the active material and other components. The pyrolyzed anodes may show improved adhesion to copper current collectors and desirable flexibility. The resulting anodes may be capable of fast charging and show similar or better cycling performance compared to the current anode technology, which uses organic solvents and lamination to a current collector for anode manufacturing.

The water soluble PAA-based polymer blends used as binders described herein have one or more of the following advantages:

1) Environmentally friendly precursors for Si anode production
2) Faster and cost-effective anode fabrication
3) Increased cycle life of Si based Li ion batteries
4) Improved anode adhesion
5) Large-scale roll-to-roll anode manufacturability
6) Increased energy density.

In an example embodiment of the disclosure, a method and system are described for water soluble PAA-based polymer blends (such as phenolic-PAA) for use as binders in silicon-dominant anodes. The water soluble PAA-based polymer blend can be present in a slurry and used to create an electrode coating layer, which may be pyrolyzed. For example, in one embodiment, the battery electrode may comprise an electrode coating layer on a current collector, where the electrode coating layer is formed from silicon and a pyrolyzed water-based phenolic-PAA polymer binder. The water soluble PAA-based polymer blend (such as phenolic-PAA) may be crosslinked and/or further reacted. The electrode coating layer may comprise conductive additives. The current collector may comprise one or more of a copper, tungsten, stainless steel, and nickel foil in electrical contact with the electrode coating layer. The electrode coating layer may comprise more than 70% silicon. The electrode may be in electrical and physical contact with an electrolyte, where the electrolyte includes a liquid, solid, or gel. The battery electrode may be in a lithium ion battery. These binder systems can be used with other type of electrochemical storage devices, including, but not limited to, Li—S (lithium sulfur), Na-ion (sodium ion), and/or Li-air (lithium-air).

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery electrode, the electrode comprising:
   an electrode coating layer on a current collector, the electrode coating layer formed from silicon and a water soluble polyacrylic acid (PAA) based polymer blend, wherein said water soluble PAA-based polymer blend comprises PAA and one or more additional water-soluble polymer components; and wherein the wt % of the PAA is from about 10 wt % to about 15 wt %; and wherein said water soluble PAA-based polymer blend comprises a PAA reacted with a phenolic resin in a ratio of phenolic:PAA of about 1:1 to about 1:5.

2. The electrode according to claim 1, wherein one or more of said one or more additional water-soluble polymer components comprises a polymer containing one or more functional groups selected from the group consisting of —OH, NH—, $NH_2$, and —COOH.

3. The electrode according to claim 1, wherein said water soluble PAA-based polymer blend is a tertiary system comprising PAA, phenolic resin and a third water-soluble polymer component.

4. The electrode according to claim 1, wherein the electrode coating layer further comprises conductive additives.

5. The electrode according to claim 1, wherein the current collector comprises one or more of a copper, tungsten, stainless steel, and nickel foil in electrical contact with the electrode coating layer.

6. The electrode according to claim 1, wherein the electrode coating layer comprises more than 70% silicon.

7. The electrode according to claim 1, wherein the electrode is in electrical and physical contact with an electrolyte, the electrolyte comprising a liquid, solid, or gel.

8. The electrode according to claim 1, wherein the battery electrode is in a lithium ion battery.

9. A method of forming an electrode, the method comprising:
creating an electrode coating layer from an electrode slurry comprising an aqueous solution of a water soluble PAA-based polymer blend and Si powder;
fabricating a battery electrode by coating the slurry on a current collector; and
pyrolyzing said electrode coating layer;
wherein said water soluble PAA-based polymer blend comprises PAA and one or more additional water-soluble polymer components; and
wherein the wt % of the PAA is from about 10 wt % to about 15 wt %; and wherein said water soluble PAA-based polymer blend comprises a PAA reacted with a phenolic resin in a ratio of phenolic:PAA of about 1:1 to about 1:5.

10. The method of claim 9, wherein one or more of said one or more additional water-soluble polymer components comprises a polymer containing one or more functional groups selected from the group consisting of —OH, NH—, $NH_2$, and —COOH.

11. The method of claim 9, wherein said water soluble PAA-based polymer blend is a tertiary system comprising PAA, phenolic resin and a third water-soluble polymer component.

12. The method according to claim 9, wherein the electrode coating layer further comprises conductive additives.

13. The method according to claim 9, wherein the current collector comprises one or more of a copper, tungsten, stainless steel, and nickel foil in electrical contact with the electrode coating layer.

14. The method according to claim 9, wherein the electrode coating layer comprises more than 70% silicon.

15. The method according to claim 9, wherein the electrode is in electrical and physical contact with an electrolyte, the electrolyte comprising a liquid, solid, or gel.

16. A battery, the battery comprising:
a cathode, a separator, an electrolyte, and an anode, the anode comprising an electrode coating layer on a current collector, the electrode coating layer formed from silicon and a pyrolyzed water soluble PAA-based polymer blend, wherein said water soluble PAA-based polymer blend comprises PAA and one or more one or more additional water-soluble polymer components; and wherein the wt % of the PAA is from about 10 wt % to about 15 wt %; and wherein said water soluble PAA-based polymer blend comprises a PAA reacted with a phenolic resin in a ratio of phenolic:PAA of about 1:1 to about 1:5.

17. The battery of claim 16, wherein said water soluble PAA-based polymer blend is a tertiary system comprising PAA, phenolic resin and a third water-soluble polymer component.

* * * * *